(12) United States Patent
Kodaira (10) Patent No.: US 8,300,320 B2
(45) Date of Patent: Oct. 30, 2012

(54) ZOOM LENS AND IMAGE PICKUP APPARATUS INCLUDING THE SAME

(75) Inventor: Masakazu Kodaira, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 13/157,003

(22) Filed: Jun. 9, 2011

(65) Prior Publication Data

US 2012/0002300 A1 Jan. 5, 2012

(30) Foreign Application Priority Data

Jun. 30, 2010 (JP) ................................. 2010-148581

(51) Int. Cl.
*G02B 15/14* (2006.01)

(52) U.S. Cl. ........................................ 359/688; 359/692

(58) Field of Classification Search .................. 359/676, 359/683, 688, 692

See application file for complete search history.

(56) References Cited

U.S. PATENT DOCUMENTS 7,885,014 B2 * 2/2011 Inomoto et al. ............... 359/688
7,982,971 B2 * 7/2011 Nakamura ..................... 359/688
8,169,533 B2 * 5/2012 Sakamoto ..................... 348/345

FOREIGN PATENT DOCUMENTS

| JP | H9-258102 A | 10/1997 |
| JP | H10-062686 A | 3/1998 |
| JP | H11-030749 A | 2/1999 |
| JP | 2000-321496 A | 11/2000 |

* cited by examiner

*Primary Examiner* — Scott J Sugarman (74) *Attorney, Agent, or Firm* — Rossi, Kimms & McDowell LLP

(57) ABSTRACT

A zoom lens, including: a first lens unit and a second lens unit, in which the first lens unit includes: a first lens sub unit which does not move; a second lens sub unit which moves for focusing; and a third lens sub unit which does not move; and in which the following expression is satisfied, $-2.27\times10^{-3} < (\theta p - \theta na)/(\nu p - \nu na) < -1.9\times10^{-3}$, where $\nu na$ and $\theta na$ represent an average value of an Abbe number $\nu$ and an average value of a partial dispersion ratio $\theta$ of negative lenses included in the first lens sub unit, respectively, $\nu p$ and $\theta p$ represent an Abbe number and a partial dispersion ratio of a positive lens having a smallest Abbe number among lenses constituting the first lens sub unit, respectively, $\theta = (Ng-NF)/(NF-NC)$, and Ng, NF and NC denote refractive indexes at the g-line, the F-line and a C-line, respectively.

6 Claims, 7 Drawing Sheets

ZOOM LENS AND IMAGE PICKUP APPARATUS INCLUDING THE SAME

BACKGROUND OF THE INVENTION

1. Field of the Invention

The present invention relates to a zoom lens suitable for a television camera or a video camera, which realizes a wider angle system while satisfactorily reducing lateral chromatic aberration at a wide-angle end.

2. Description of the Related Art

Conventionally, many proposals have been made about a zoom lens, which includes, in order from an object side, a first lens unit which has positive refractive power and does not move for magnification-varying, a second lens unit having negative refractive power for the magnification-varying, a third lens unit having negative refractive power for correcting image plane displacement due to the magnification-varying, and a fourth lens unit which has positive refractive power and does not move for magnification-varying.

In Japanese Patent Application Laid-Open No. 2000-321496, Japanese Patent Application Laid-Open No. H11-030749, Japanese Patent Application Laid-Open No. H10-062686 and Japanese Patent Application Laid-Open No. H09-258102, there is disclosed that a focal length is 5.5 to 4.8 mm at the wide-angle end in numerical embodiments.

Japanese Patent Application Laid-Open No. 2000-321496, Japanese Patent Application Laid-Open No. H11-030749, Japanese Patent Application Laid-Open No. H10-062686 and Japanese Patent Application Laid-Open No. H09-258102 disclose that a focal length is 5.5 to 4.8 mm at the wide-angle end in numerical embodiments. In order to realize a wider angle system, it is necessary to correct secondary spectrum of the lateral chromatic aberration at the wide-angle end. Therefore, an object of the present invention is to provide a zoom lens suitable for a broadcast zoom lens in particular, having a focal length of 4.8 mm or smaller at the wide-angle end, in which secondary spectrum of the lateral chromatic aberration at the wide-angle end is satisfactorily corrected in particular, and to provide an image pickup apparatus including the zoom lens.

SUMMARY OF THE INVENTION

In order to achieve the above-mentioned object, a zoom lens of the present invention includes, in order from an object side: a first lens unit which has positive refractive power and does not move for magnification-varying; and a second lens unit which has negative refractive power and moves for the magnification-varying, in which the first lens unit includes, in order from the object side: a first lens sub unit which has negative refractive power and does not move; a second lens sub unit which has positive refractive power and moves for focusing; and a third lens sub unit which has positive refractive power and does not move; and in which the following expression is satisfied, $$-2.27 \times 10^{-3} < (\theta p - \theta na)/(\nu p - \nu na) < -1.9 \times 10^{-3},$$

where $\nu na$ and $\theta na$ represent an average value of an Abbe number $\nu$ and an average value of a partial dispersion ratio $\theta$ of negative lenses included in the first lens sub unit, respectively, $\nu p$ and $\theta p$ represent an Abbe number and a partial dispersion ratio of a positive lens having a smallest Abbe number among lenses constituting the first lens sub unit, respectively, $\theta = (Ng - NF)/(NF - NC)$, and $Ng$, $NF$ and $NC$ denote refractive indexes at the g-line, the F-line and a C-line, respectively.

In the zoom lens of the present invention according to another embodiment, the following expression is satisfied, $$0.5 < |f11/f13| < 0.77,$$

where f11 represents a focal length of the first lens sub unit, and f13 represents a focal length of the third lens sub unit.

In the zoom lens of the present invention according to another embodiment, the following expression is satisfied, $$1.71 < Nn < 1.78,$$

where Nn represents an average refractive index of negative lenses included in the first lens sub unit.

In the zoom lens of the present invention according to another embodiment, the following expression is satisfied, $$0.33 < fw/IS < 0.44,$$

where fw represents a focal length at a wide-angle end and IS represents an image size.

The zoom lens of the present invention according to another embodiment further includes, on an image plane side of the second lens unit, in order from the object side: a third lens unit which has negative refractive power and moves for correcting image plane variation due to the magnification-varying; and a fourth lens unit which has positive refractive power and does not move for the magnification-varying.

An image pickup apparatus of the present invention includes the above-mentioned zoom lens.

According to the present invention, it is possible to achieve a zoom lens that has a focal length of 4.8 mm or smaller at the wide-angle end, in which secondary spectrum of the lateral chromatic aberration at the wide-angle end is satisfactorily corrected.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

A zoom lens of the present invention includes, in order from the object side, a first lens unit F which has positive refractive power and does not move for magnification-varying, a second lens unit V which has negative refractive power and moves during the magnification-varying, a third lens unit C which has negative refractive power, and a fourth lens unit R which does not move for the magnification-varying. The first lens unit F includes, in order from the object side, a first lens sub unit $1a$ which has negative refractive power and does not move, a second lens sub unit $1b$ which has positive refractive power and moves during focusing, and a third lens sub unit $1c$ which has positive refractive power and does not move. The second lens unit V and the third lens unit C are lens units which move during the magnification-varying (during zooming) and move along different loci during the magnification-varying. The second lens unit V is a variator for magnification-varying and performs the magnification-varying from the wide-angle end to the telephoto end when it moves monotonously on the optical axis to the image plane side. The third lens unit C is a compensator disposed on the image plane side of the second lens unit and moves nonlinearly on the optical axis to the object side so as to correct image plane variation due to the magnification-varying. The variator V and the compensator C constitute a magnification-varying system. A stop is denoted by SP, and a relay lens unit denoted by R is a fourth lens unit having positive refractive power for imaging, which is fixed (which does not move for magnification-varying). A color separation prism, an optical filter or the like is denoted by P, which is illustrated as a glass block in the diagram. An imaging plane is denoted by I.

Further, here, the zoom lens of this embodiment includes, in order from the most object side (subject side, magnification side), a first lens unit having positive refractive power (lens unit disposed on the most object side), a second lens unit having negative refractive power, a third lens unit having negative refractive power, and a fourth lens unit having positive refractive power, but this is not a limitation. For instance, the third lens unit C may have positive refractive power, or another lens unit having positive or negative refractive power may be added between the second lens unit and the third lens unit so as to form a five-lens-unit structure. On the contrary, the zoom lens may be constituted of only the first lens unit and the second lens unit. As a matter of course, the zoom lens may be constituted of only the first lens unit, the second lens unit, and the third lens unit. Further, the zoom lens may be constituted of the first lens unit having positive refractive power, the second lens unit having positive refractive power, the third lens unit having negative refractive power, or may be constituted of the first lens unit having positive refractive power, the second lens unit having negative refractive power, and the third lens unit having positive refractive power.

The zoom lens according to the present invention can satisfactorily correct the secondary spectrum of the lateral chromatic aberration at the wide-angle end by defining dispersion characteristic condition of the lens material. Specifically, an average value of the Abbe number $\nu$ and an average value of the partial dispersion ratio $\theta$ at the g-line and the F-line of the negative lens included in the first lens sub unit $1a$ are denoted by $\nu na$ and $\theta na$, respectively. The Abbe number and the partial dispersion ratio of the positive lens having a smallest Abbe number among lenses constituting the first lens sub unit $1a$ are denoted by $\nu p$ and $\theta p$, respectively. Then, the following expression is satisfied.

$$-2.27\times10^{-3} < (\theta p - \theta na)/(\nu p - \nu na) < -1.9\times10^{-3} \tag{1}$$

As a result, the amount of the residual secondary spectrum of the lateral chromatic aberration of the first lens sub unit $1a$ having negative refractive power in the first lens unit can be reduced, so that the secondary spectrum of the lateral chromatic aberration at the wide-angle end is appropriately corrected. Here, the Abbe number $\nu$ and the partial dispersion ratio $\theta$ are expressed by the equations as follows, where the refractive index at the g-line is denoted by Ng, the refractive index at the F-line is denoted by NF, the refractive index at the d-line is denoted by Nd, and the refractive index at the C-line is denoted by NC.

$$\nu = (Nd-1)/(NF-NC) \tag{2}$$

$$\theta = (Ng-NF)/(NF-NC) \tag{3}$$

Figure 7:
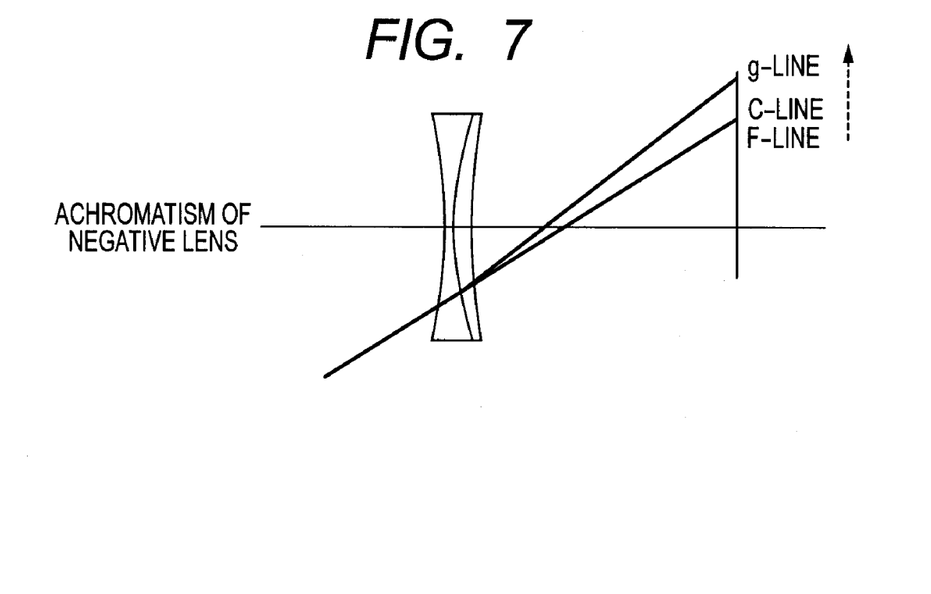
FIG. 7 is a schematic diagram about two-color achromatism and residual secondary spectrum of a negative lens unit.
Figure 8:
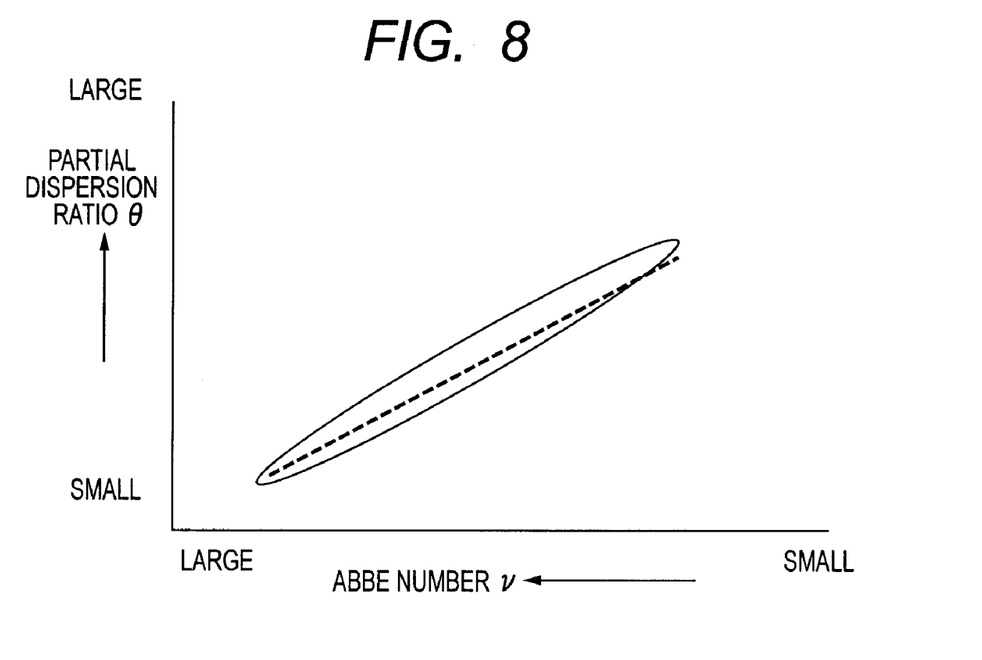
FIG. 8 is a schematic diagram of a distribution of an Abbe number $\nu$ and a partial dispersion ratio $\theta$ of optical materials.

FIG. 7 illustrates a schematic diagram of the two-color achromatism and the residual secondary spectrum of the negative lens unit. FIG. 8 illustrates a schematic diagram of the distribution of the Abbe number $\nu$ and the partial dispersion ratio $\theta$ of existing optical materials.

As illustrated in FIG. 8, existing optical materials are distributed in the range where the partial dispersion ratio $\theta$ is small with respect to the Abbe number $\nu$, in which the partial dispersion ratio $\theta$ tends to be larger as the Abbe number $\nu$ is smaller.

Here, a thin lens system is supposed, which is constituted of two lenses 1 and 2 having refractive powers $\phi 1$ and $\phi 2$ and Abbe numbers $\nu 1$ and $\nu 2$, respectively, and has a predetermined refractive power $\phi (=\phi 1+\phi 2)$. In this thin lens system, setting the value expressed by the following expression to zero, $$\phi 1/\nu 1 + \phi 2/\nu 2 \tag{4},$$

causes imaging positions of the C-line and of the F-line correspond to each other, to thereby reduce the chromatic aberration.

For achromatism of the negative lens unit, a material having small Abbe number $\nu 1$ is selected as the material of the positive lens 1, while a material having large Abbe number $\nu 2$ is selected as the material of the negative lens 2. Therefore, as understood from FIG. 8, the partial dispersion ratio $\phi 1$ of the positive lens 1 is larger than the partial dispersion ratio $\phi 2$ of the negative lens 2. For this reason, when the chromatic aberration is corrected for the F-line and the C-line, the imaging position of the g-line is shifted to the side where the image height is higher. The shift amount is defined as a secondary spectrum amount $\Delta$ of the lateral chromatic aberration and is expressed by the following equation.

$$\Delta = -(1/\phi)\times(\phi 1-\phi 2)/(\nu 1-\nu 2) \tag{5}$$

Here, secondary spectrum amounts of the first lens sub unit $1a$, the second lens sub unit $1b$, the third lens sub unit $1c$, the second lens unit V, the third lens unit C, and the fourth lens unit R are denoted by $\Delta 1a$, $\Delta 1b$, $\Delta 1c$, $\Delta 2$, $\Delta 3$, and $\Delta 4$, respectively. Further, imaging magnifications of the second lens sub unit $1b$, the third lens sub unit $1c$, the second lens unit V, the third lens unit C, and the fourth lens unit R are denoted by $\beta 1b$, $\beta 1c$, $\beta 2$, $\beta 3$, and $\beta 4$, respectively.

Then, the secondary spectrum amount $\Delta$ of the entire lens system is expressed by the following equation.

$$\Delta = \Delta 1a \times \beta 1b^2 \times \beta 1c^2 \times \beta 2^2 \times \beta 3^2 \times \beta 4^2 + \qquad (6)$$

$$\Delta 1b \times (1-\beta b) \times \beta 1c^2 \times \beta 2^2 \times \beta 3^2 \times \beta 4^2 +$$

$$\Delta 1c \times (1-\beta 1c) \times \beta 2^2 \times \beta 3^2 \times \beta 4^2 +$$

$$\Delta 2 \times (1-\beta 2) \times \beta 3^2 \times \beta 4^2 + \Delta 3 \times (1-\beta 3) \times \beta 4^2 + \Delta 4 \times (1-\beta 4)$$

The secondary spectrum amount $\Delta$ of the lateral chromatic aberration is generated conspicuously in the first lens unit where an off-axis beam passes through a high position on the wide angle side.

Therefore, by reducing secondary spectrum amount $\Delta 1a$ of the lateral chromatic aberration generated in the first lens sub unit $1a$, the secondary spectrum amount $\Delta$ of the lateral chromatic aberration on the wide angle side can be reduced. Further, it is more preferred that the following conditional expression be satisfied.

$$-2.13 \times 10^{-3} \leq (\theta p - \theta na)/(\nu p - \nu na) \leq -1.94 \times 10^{-3} \qquad (1a)$$

In the case where the lower limit of the conditional expression (1) is not satisfied, the secondary spectrum correction effect by the first lens unit is insufficient, and it is difficult to satisfactorily correct the lateral chromatic aberration at the wide-angle end.

Further, the zoom lens of the present invention has a feature that a ratio between the focal length f11 of the first lens sub unit $1a$ and the focal length f13 of the third lens sub unit $1c$ satisfies the following expression.

$$0.5 < |f11/f13| < 0.77 \qquad (7)$$

Thus, the position of the principal point of the first lens unit is shifted to the image plane side, so that a distance between the image point position of the first lens unit and the principal point position of the second lens unit can be increased. Therefore, the wider angle system can be achieved. In addition, a condition is shown, which is effective for correction of the lateral chromatic aberration at the wide-angle end, the axial chromatic aberration at the telephoto end, and spherical aberration. In addition, it is more preferred to satisfy the following conditional expression.

$$0.51 \leq |f11/f13| \leq 0.75 \qquad (7a)$$

In the case where the upper limit of the conditional expression (7) is not satisfied, the principal point position of the first lens unit cannot be shifted to the image plane side. As a result, it is difficult to realize the wider angle system. In addition, in the case where the focal length f11 of the first lens sub unit $1a$ is large with respect to the focal length f13 of the third lens sub unit $1c$ to fail to satisfy the upper limit of the conditional expression (7), the secondary spectrum correction of the lateral chromatic aberration at the wide-angle end is insufficient. In addition, in the case where the focal length f13 is small with respect to the focal length f11 to fail to satisfy the upper limit of the conditional expression (7), it is difficult to correct spherical aberration at the telephoto end, which is not appropriate.

Further, in the zoom lens of the present invention, the refractive index of the negative lens among lenses constituting the first lens sub unit $1a$ is defined, so that aberrations at the wide-angle end can be effectively reduced. Specifically, when the average refractive index of negative lenses included in the first lens sub unit $1a$ of the first lens unit F is denoted by Nn, the following expression is satisfied.

$$1.71 < Nn < 1.78 \qquad (8)$$

In addition, it is more preferred to satisfy the following expression.

$$1.72 < Nn < 1.76 \qquad (8a)$$

In the case where the lower limit of the conditional expression (8) is not satisfied, curvature of the negative lens included in the first lens sub unit $1a$ increases (curvature radius decreases). As a result, it is difficult to correct aberrations generated in the first lens sub unit $1a$, which is not appropriate.

Further, in the zoom lens of the present invention, an appropriate angle of field at the wide-angle end is defined so that the lateral chromatic aberration at the wide-angle end is satisfactorily corrected and that a small zoom lens is achieved. When the focal length at the wide-angle end is denoted by fw, and a diagonal length of the image size (namely, twice the image height) is denoted by IS, the following expression is satisfied.

$$0.33 < fw/IS < 0.44 \qquad (9)$$

In addition, it is more preferred to satisfy the following expression.

$$0.35 \leq fw/IS \leq 0.41 \qquad (9a)$$

The zoom lens of the present invention can satisfactorily correct the secondary spectrum of the lateral chromatic aberration at the wide-angle end in which the focal length at the wide-angle end is 4.8 mm or smaller. In addition, the image pickup apparatus including the zoom lens of the present invention can realize a television camera and a video camera which can satisfactorily reduce the lateral chromatic aberration at the wide-angle end.

Embodiment 1

Figure 1:
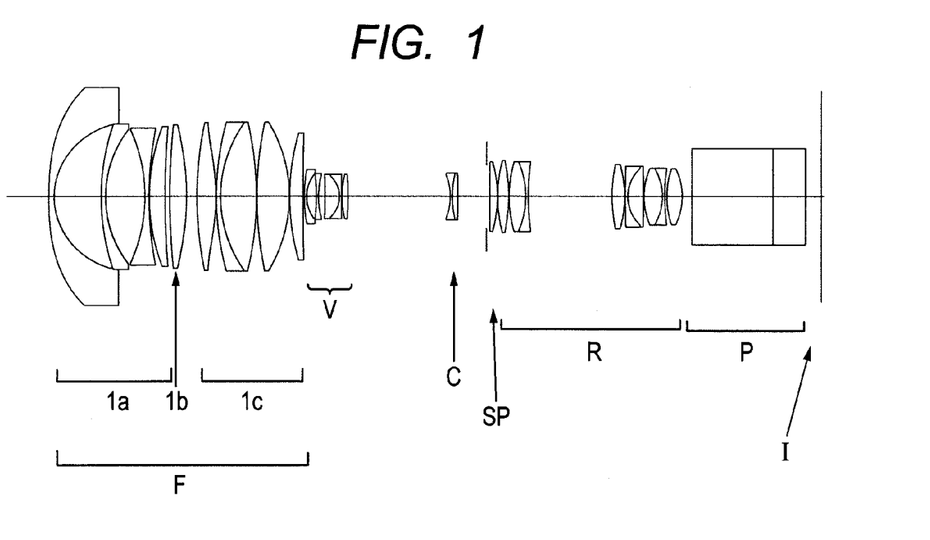
FIG. 1 is a cross sectional view at a wide-angle end according to Embodiment 1.
Figure 2A:
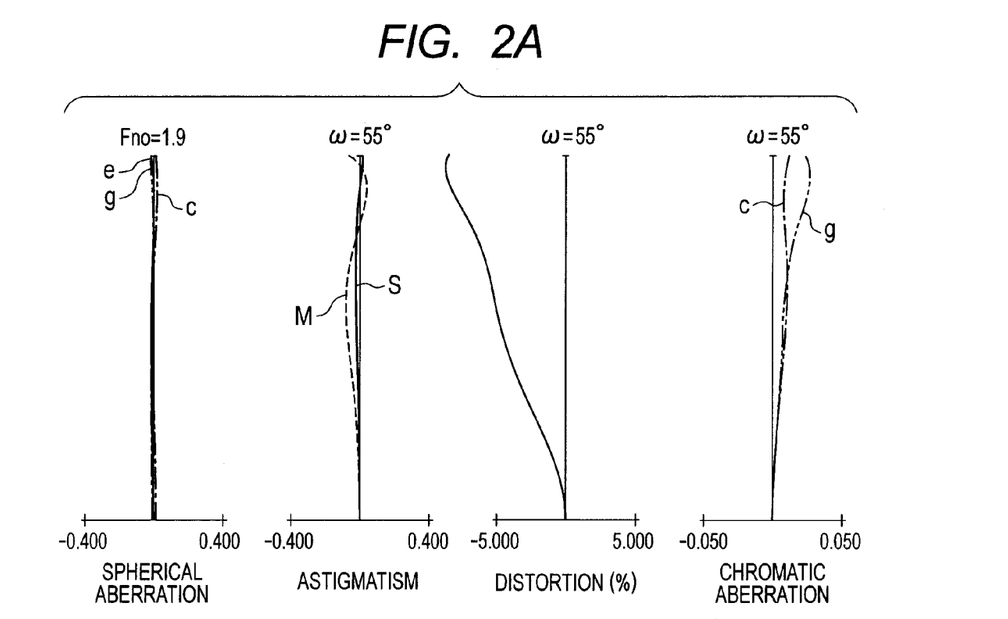
FIG. 2A is an aberration diagram at f=3.85 mm according to Embodiment 1.
Figure 2B:
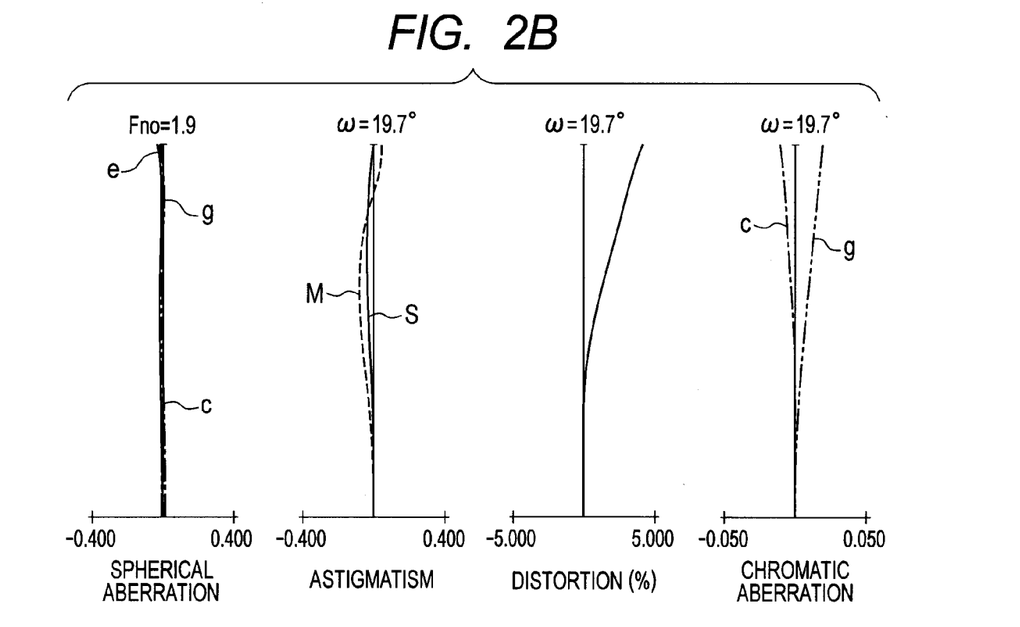
FIG. 2B is an aberration diagram at f=15.4 mm according to Embodiment 1.
Figure 2C:
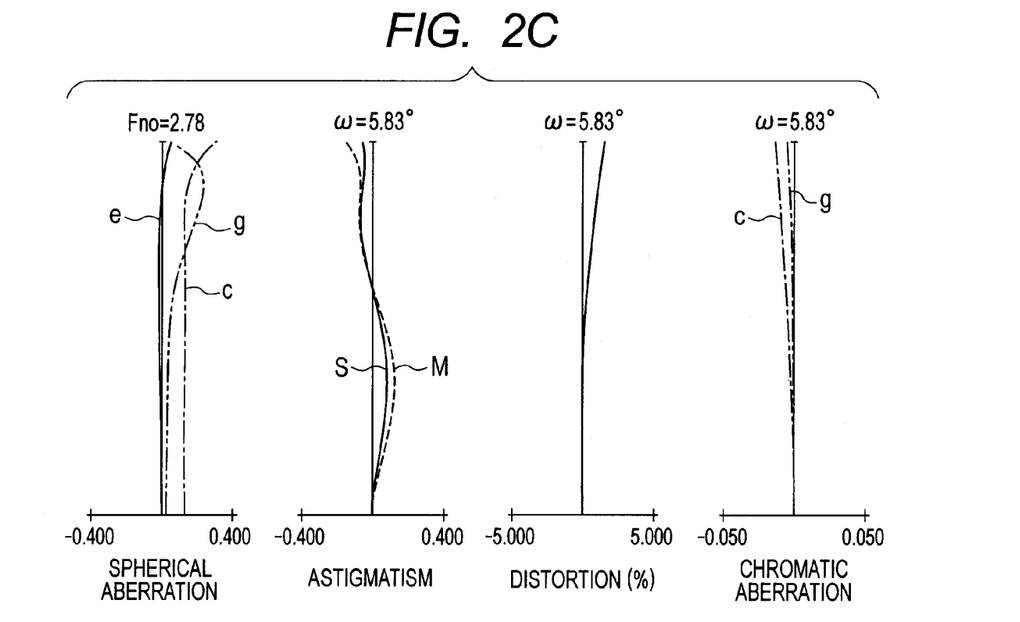
FIG. 2C is an aberration diagram at f=53.9 mm according to Embodiment 1.

FIG. 1 is a cross sectional view at the wide-angle end of a zoom lens of Embodiment 1 of the present invention. FIGS. 2A, 2B and 2C illustrate aberration diagrams when the zoom position of the zoom lens of Embodiment 1 is at the wide-angle end, at f=15.4 mm, and at the telephoto end.

As illustrated in FIG. 1, the zoom lens of Embodiment 1 includes, in order from the object side, a first lens unit F having positive refractive power as a front lens unit, a second lens unit V having negative refractive power for magnification-varying as a variator, a third lens unit C having negative refractive power as a compensator, a stop SP, a fourth lens unit R having positive refractive power and an imaging function as a relay lens unit which is fixed, and an optical element P such as a color separation prism or an optical filter (illustrated as a glass block P in FIG. 1).

The first lens unit F includes, in order from the object side, a first lens sub unit $1a$ which has negative power and does not move, a second lens sub unit $1b$ which has positive power and moves in the optical axis direction for focusing, and a third lens sub unit $1c$ which has positive power and does not move. The second lens unit V moves monotonously on the optical axis to the image plane side so as to perform magnification-varying from the wide-angle end to the telephoto end. The third lens unit C moves nonlinearly on the optical axis to the object side so as to correct the image plane variation due to the magnification-varying. The second lens unit V as a variator and the third lens unit C as a compensator constitute the magnification-varying system. An imaging plane is denoted by I in FIG. 1.

Hereinafter, Numerical Embodiment 1 corresponding to Embodiment 1 is described.

A curvature radius of the surface is denoted by r, an interval between surfaces is denoted by d, a refractive index at the d-line is denoted by nd, an Abbe number at the d-line is denoted by Γd, a partial dispersion ratio at the g-line and the F-line expressed by (Ng-NF)/(NF-NC) is denoted by θgF, and a back focus is denoted by BF. Note that, surface numbers are assigned in order from the object side.

In addition, an aspherical shape is expressed by the following equation, where the optical axis direction is the X axis direction, the direction perpendicular to the optical axis is the H axis direction, the beam propagation direction is the positive direction, a paraxial curvature radius is denoted by R, a conic constant is denoted by K, and an i-th aspherical coefficient is denoted by $A_i$.

$$X = \frac{H^2/R}{1 + \sqrt{1 - (1+K)(H/R)^2}} + \sum_{i=3} A_i H^i \qquad (10)$$

In the numerical embodiment, the conic constant K and the aspherical coefficient $A_i$ are described.

The first lens sub unit 1a includes, in order from the object side, a negative lens, a negative lens, a negative lens and a positive lens, which correspond to the first to eighth surfaces. The positive lens which is the fourth lens from the object side in the first lens sub unit 1a corresponds to the positive lens having the smallest Abbe number in the first lens sub unit 1a.

Values corresponding to the conditional expressions in Embodiment 1 are shown in Table 1. This numerical embodiment satisfies any of the conditional expressions, so as to achieve high optical performance in which the lateral chromatic aberration at the wide-angle end is satisfactorily corrected while realizing such a wide angle that a focal length at the wide-angle end is 4.8 mm or smaller.

| Numerical Embodiment 1 | | | | | | | |
|---|---|---|---|---|---|---|---|
| Surface No. | r | d | nd | νd | θgF | Effective diameter | Focal length |
| 1 | 148.91537 | 2.25000 | 1.882997 | 40.76 | 0.5667 | 90.671 | −46.316 |
| 2 | 32.00289 | 19.18937 | 1.000000 | 0.00 | 0.0000 | 61.611 | 0.000 |
| 3 | 101.28248 | 1.80000 | 1.696797 | 55.53 | 0.5433 | 61.120 | −139.775 |
| 4 | 49.39466 | 16.06047 | 1.000000 | 0.00 | 0.0000 | 56.582 | 0.000 |
| 5 | −73.30027 | 1.70000 | 1.696797 | 55.53 | 0.5433 | 55.999 | −72.217 |
| 6 | 164.28610 | 0.13500 | 1.000000 | 0.00 | 0.0000 | 57.323 | 0.000 |
| 7 | 88.68896 | 6.39879 | 1.846660 | 23.78 | 0.6034 | 58.628 | 133.077 |
| 8 | 388.70383 | 1.90684 | 1.000000 | 0.00 | 0.0000 | 58.449 | 0.000 |
| 9 | 326.72064 | 6.85086 | 1.603112 | 60.64 | 0.5414 | 59.540 | 139.954 |
| 10 | −113.51010 | 4.27187 | 1.000000 | 0.00 | 0.0000 | 60.091 | 0.000 |
| 11 | 166.54947 | 7.66954 | 1.438750 | 94.99 | 0.5342 | 62.158 | 136.185 |
| 12 | −92.23050 | 0.13500 | 1.000000 | 0.00 | 0.0000 | 62.183 | 0.000 |
| 13 | 128.41169 | 1.70000 | 1.846660 | 23.78 | 0.6205 | 62.663 | −120.289 |
| 14 | 56.76114 | 14.66533 | 1.438750 | 94.99 | 0.5342 | 61.670 | 94.624 |
| 15 | −143.72107 | 0.16200 | 1.000000 | 0.00 | 0.0000 | 62.085 | 0.000 |
| 16 | 164.57698 | 13.21487 | 1.496999 | 81.54 | 0.5375 | 62.624 | 94.342 |
| 17 | −64.07857 | 0.16200 | 1.000000 | 0.00 | 0.0000 | 62.469 | 0.000 |
| 18 | 105.86978 | 5.42663 | 1.592400 | 68.30 | 0.5456 | 53.069 | 190.137 |
| 19 | 1639.56228 | (Variable) | 1.000000 | 0.00 | 0.0000 | 51.505 | 0.000 |
| 20 | 64.62195 | 0.90000 | 1.882997 | 40.76 | 0.5667 | 22.181 | −24.507 |
| 21 | 16.17516 | 4.01943 | 1.000000 | 0.00 | 0.0000 | 18.962 | 0.000 |
| 22 | −83.29858 | 0.90000 | 1.834000 | 37.16 | 0.5775 | 18.632 | −31.865 |
| 23 | 39.58667 | 2.68185 | 1.000000 | 0.00 | 0.0000 | 17.930 | 0.000 |
| 24 | −200.97530 | 5.85821 | 1.784723 | 25.68 | 0.6161 | 17.728 | 16.791 |
| 25 | −12.63264 | 0.90000 | 1.882997 | 40.76 | 0.5667 | 17.634 | −14.580 |
| 26 | −533.45474 | 0.12819 | 1.000000 | 0.00 | 0.0000 | 17.911 | 0.000 |
| 27 | 42.89063 | 2.41461 | 1.592701 | 35.31 | 0.5933 | 18.013 | 55.785 |
| 28 | −145.50059 | (Variable) | 1.000000 | 0.00 | 0.0000 | 17.889 | 0.000 |
| 29 | −25.95493 | 0.80000 | 1.740999 | 52.64 | 0.5467 | 17.126 | −21.721 |
| 30 | 43.44434 | 2.24960 | 1.808095 | 22.76 | 0.6307 | 18.502 | 48.410 |
| 31 | −427.71274 | (Variable) | 1.000000 | 0.00 | 0.0000 | 18.946 | 0.000 |
| 32 | 0.00000 | 1.40000 | 1.000000 | 0.00 | 0.0000 | 27.084 | 0.000 |
| 33 | 4615.65877 | 2.98519 | 1.723420 | 37.95 | 0.5836 | 28.064 | 79.424 |
| 34 | −58.53296 | 0.15000 | 1.000000 | 0.00 | 0.0000 | 28.521 | 0.000 |
| 35 | 63.01824 | 4.46957 | 1.639999 | 60.07 | 0.5372 | 29.604 | 55.226 |
| 36 | −78.96423 | 0.22000 | 1.000000 | 0.00 | 0.0000 | 29.585 | 0.000 |
| 37 | 56.57823 | 6.76527 | 1.516330 | 64.14 | 0.5352 | 28.632 | 45.776 |
| 38 | −39.18587 | 1.00000 | 1.882997 | 40.76 | 0.5667 | 27.778 | −32.587 |
| 39 | 112.03673 | 34.00000 | 1.000000 | 0.00 | 0.0000 | 27.219 | 0.000 |
| 40 | 68.23275 | 5.15077 | 1.567322 | 42.80 | 0.5730 | 26.380 | 53.123 |
| 41 | −53.02455 | 0.30000 | 1.000000 | 0.00 | 0.0000 | 26.026 | 0.000 |
| 42 | 521.27243 | 1.00000 | 1.882997 | 40.76 | 0.5667 | 24.834 | −20.258 |
| 43 | 17.37609 | 6.40031 | 1.516330 | 64.14 | 0.5352 | 23.149 | 32.251 |
| 44 | −383.71550 | 0.20000 | 1.000000 | 0.00 | 0.0000 | 23.175 | 0.000 |
| 45 | 32.63023 | 7.45733 | 1.516330 | 64.14 | 0.5352 | 23.152 | 28.636 |
| 46 | −25.09727 | 1.00000 | 1.882997 | 40.76 | 0.5667 | 22.452 | −21.948 |
| 47 | 88.93537 | 0.87964 | 1.000000 | 0.00 | 0.0000 | 22.428 | 0.000 |
| 48 | 39.08867 | 6.24935 | 1.487490 | 70.23 | 0.5300 | 22.838 | 35.185 |
| 49 | −29.13439 | 4.00000 | 1.000000 | 0.00 | 0.0000 | 22.710 | 0.000 |
| 50 | 0.00000 | 33.00000 | 1.608590 | 46.44 | 0.5664 | 40.000 | 0.000 |
| 51 | 0.00000 | 13.20000 | 1.516800 | 64.17 | 0.5347 | 40.000 | 0.000 |
| 52 | 0.00000 | 0.00000 | 1.000000 | 0.00 | 0.0000 | 40.000 | 0.000 |

-continued

Aspherical surface data

Second surface $K = 5.31002$  $A_4 = 3.43635 \times 10^{-6}$  $A_6 = -2.83495 \times 10^{-10}$  $A_8 = -3.90687 \times 10^{-13}$  $A_{10} = -9.82135 \times 10^{-18}$
$A_3 = -2.93410 \times 10^{-5}$  $A_5 = -3.55248 \times 10^{-8}$  $A_7 = 1.32522 \times 10^{-11}$  $A_9 = 5.61324 \times 10^{-15}$ Eleventh surface $K = 2.65305$  $A_4 = 1.00167 \times 10^{-6}$  $A_6 = -6.30003 \times 10^{-10}$  $A_8 = 3.10208 \times 10^{-13}$  $A_{10} = 2.64339 \times 10^{-15}$
$A_{12} = -2.64750 \times 10^{-19}$
$A_3 = -5.49042 \times 10^{-6}$  $A_5 = 2.59700 \times 10^{-8}$  $A_7 = -9.25794 \times 10^{-12}$  $A_9 = -5.79758 \times 10^{-14}$  $A_{11} = -2.28424 \times 10^{-17}$ Thirteenth surface $K = -3.70766$  $A_4 = 1.17206 \times 10^{-6}$  $A_6 = -2.10878 \times 10^{-10}$  $A_8 = 1.10236 \times 10^{-12}$  $A_{10} = -6.45790 \times 10^{-16}$
$A_{12} = 5.37441 \times 10^{-19}$
$A_3 = 1.38034 \times 10^{-6}$  $A_5 = -1.52397 \times 10^{-9}$  $A_7 = 2.13635 \times 10^{-11}$  $A_9 = -9.48024 \times 10^{-15}$  $A_{11} = -1.45634 \times 10^{-17}$

Various data

| | | | | | |
|---|---|---|---|---|---|
| Zoom ratio | 14.00 | | | | |
| Focal length | 3.85 | 8.08 | 15.40 | 27.72 | 53.90 |
| F-number | 1.90 | 1.90 | 1.90 | 1.90 | 2.78 |
| Angle of field | 55.01 | 34.23 | 19.65 | 11.22 | 5.83 |
| Image height | 5.50 | 5.50 | 5.50 | 5.50 | 5.50 |
| Total lens length | 314.94 | 314.94 | 314.94 | 314.94 | 314.94 |
| BF | 6.60 | 6.60 | 6.60 | 6.60 | 6.60 |
| d20 | 0.49 | 19.89 | 31.14 | 38.10 | 42.85 |
| d29 | 41.77 | 20.10 | 8.49 | 4.16 | 7.29 |
| d32 | 11.70 | 13.98 | 14.34 | 11.70 | 3.83 |
| d53 | 6.60 | 6.60 | 6.60 | 6.60 | 6.60 |
| Entrance pupil position | 31.49 | 39.60 | 51.19 | 67.94 | 96.53 |
| Exit pupil position | 291.15 | 291.15 | 291.15 | 291.15 | 291.15 |
| Front principal point position | 35.40 | 47.91 | 67.42 | 98.36 | 160.64 |
| Rear principal point position | 2.75 | -1.48 | -8.80 | -21.12 | -47.30 |

Zoom lens unit data

| Unit | Leading surface | Focal length | Lens structure length | Front principal point position | Rear principal point position |
|---|---|---|---|---|---|
| 1 | 1 | 24.39 | 103.70 | 43.21 | 36.77 |
| 2 | 21 | -16.27 | 17.80 | 0.72 | -13.42 |
| 3 | 30 | -40.00 | 3.05 | -0.16 | -1.86 |
| 4 | 33 | 63.37 | 129.83 | 74.42 | -135.54 |

Embodiment 2

Figure 3:
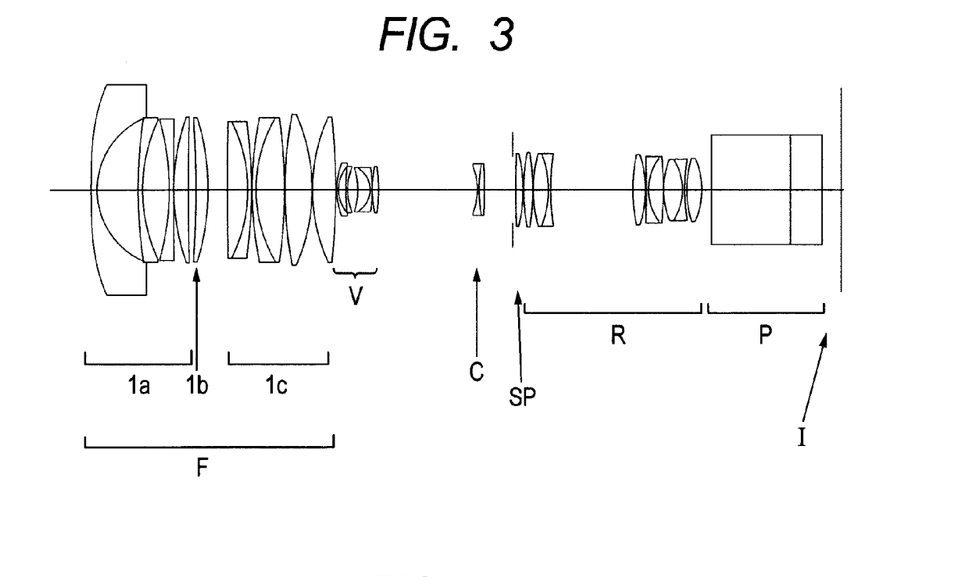
FIG. 3 is a cross sectional view at a wide-angle end according to Embodiment 2.
Figure 4A:
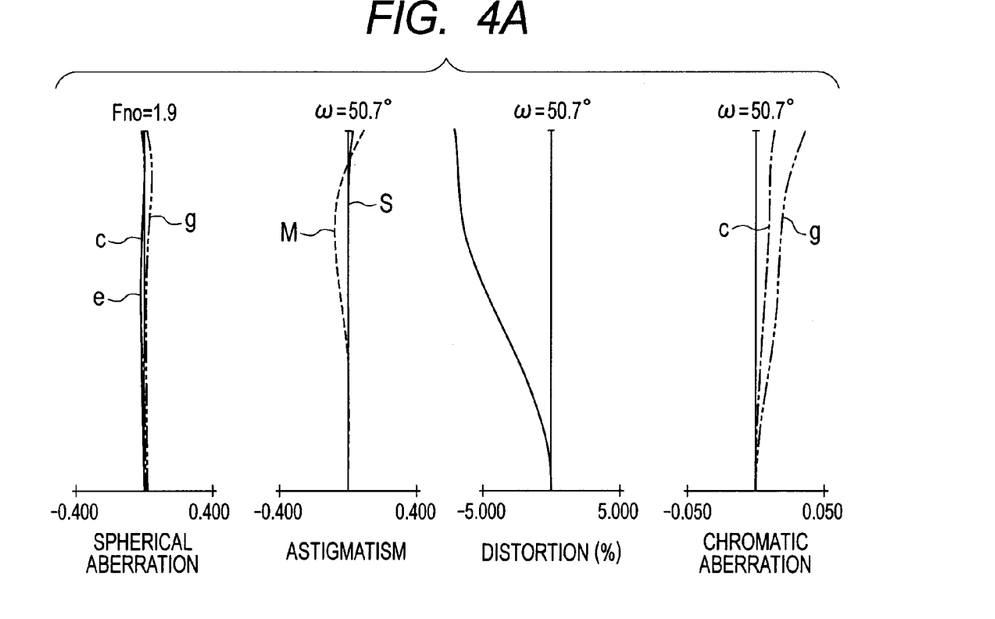
FIG. 4A is an aberration diagram at f=4.5 mm according to Embodiment 2.
Figure 4B:
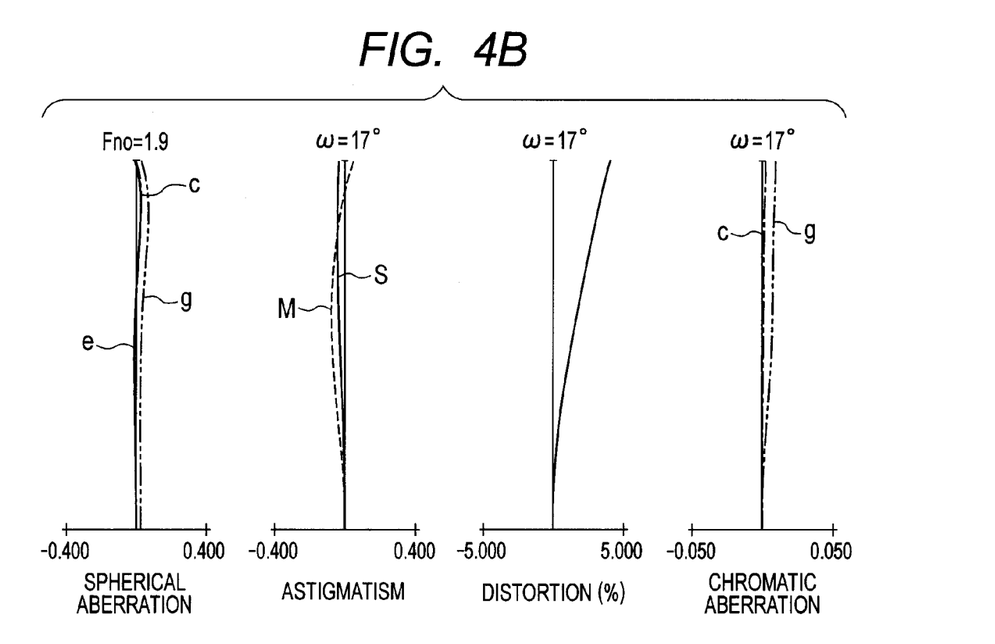
FIG. 4B is an aberration diagram at f=18 mm according to Embodiment 2.
Figure 4C:
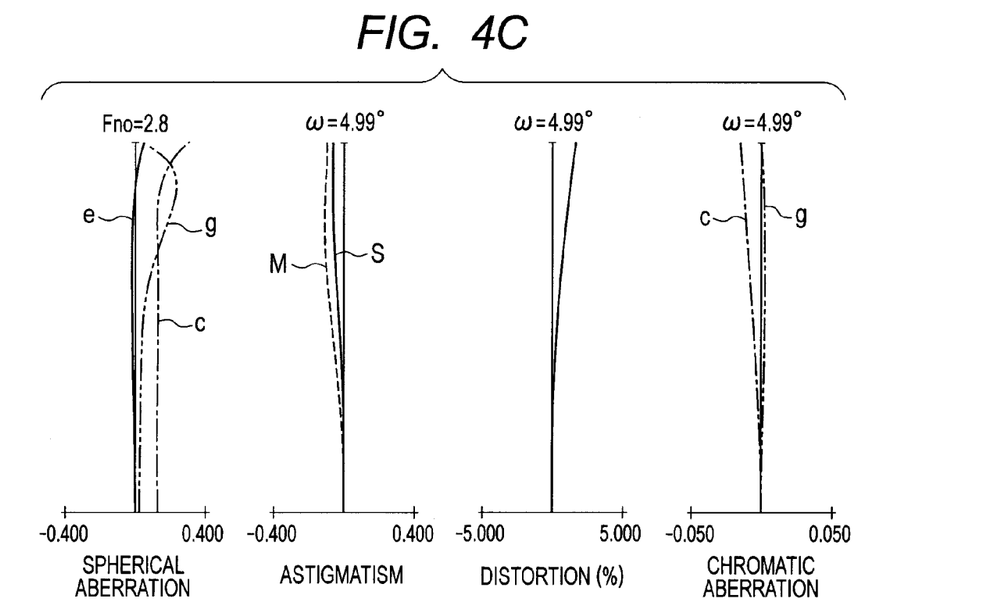
FIG. 4C is an aberration diagram at f=63 mm according to Embodiment 2.

FIG. 3 is a cross sectional view at the wide-angle end of a zoom lens of Embodiment 2 of the present invention. FIGS. 4A, 4B and 4C illustrate aberration diagrams when the zoom position of the zoom lens of Embodiment 2 is at the wide-angle end, at f=18 mm, and at the telephoto end.

The structure of the zoom lens of Embodiment 2 illustrated in FIG. 3 is the same as the structure of the zoom lens of Embodiment 1 illustrated in FIG. 1, and hence the description of the outline of the structure is omitted. Embodiment 2 has the same basic structure as Embodiment 1, but has different optical surface shape, which is therefore described in detail in Numerical Embodiment 2 as following.

Values corresponding to the conditional expressions in Embodiment 2 are shown in Table 1. This numerical embodiment satisfies any of the conditional expressions, so as to achieve high optical performance in which the lateral chromatic aberration at the wide-angle end is satisfactorily corrected while realizing such a wide angle which a focal length at the wide-angle end is 4.8 mm or smaller.

Numerical Embodiment 2

| Surface No. | r | d | nd | νd | θgF | Effective diameter | Focal length |
|---|---|---|---|---|---|---|---|
| 1 | 497.51526 | 2.50000 | 1.772500 | 49.50 | 0.5519 | 84.018 | -44.492 |
| 2 | 32.22262 | 17.10285 | 1.000000 | 0.00 | 0.0000 | 58.669 | 0.000 |
| 3 | 202.46621 | 1.85000 | 1.696797 | 55.53 | 0.5433 | 58.507 | -145.730 |
| 4 | 67.56483 | 11.16361 | 1.000000 | 0.00 | 0.0000 | 56.160 | 0.000 |
| 5 | -106.12685 | 1.75000 | 1.696797 | 55.53 | 0.5433 | 56.083 | -141.824 |
| 6 | 1541.34595 | 0.15000 | 1.000000 | 0.00 | 0.0000 | 57.174 | 0.000 |
| 7 | 88.29891 | 6.06785 | 1.896760 | 23.00 | 0.6108 | 58.906 | 106.653 |

-continued

| | | | | | | | |
|---|---|---|---|---|---|---|---|
| 8 | 991.67473 | 3.16436 | 1.000000 | 0.00 | 0.0000 | 58.676 | 0.000 |
| 9 | -441.08762 | 5.01983 | 1.603112 | 60.64 | 0.5414 | 58.233 | 214.416 |
| 10 | -100.73364 | 8.09313 | 1.000000 | 0.00 | 0.0000 | 58.056 | 0.000 |
| 11 | 2227.68601 | 8.41372 | 1.438750 | 94.99 | 0.5342 | 54.815 | 138.835 |
| 12 | -62.71570 | 1.65000 | 1.654115 | 39.70 | 0.5737 | 54.714 | -161.046 |
| 13 | -155.24757 | 0.15000 | 1.000000 | 0.00 | 0.0000 | 55.212 | 0.000 |
| 14 | 144.53792 | 1.65000 | 1.846660 | 23.78 | 0.6205 | 57.321 | -117.902 |
| 15 | 59.07650 | 11.78733 | 1.438750 | 94.99 | 0.5342 | 57.553 | 106.077 |
| 16 | -208.43782 | 0.18000 | 1.000000 | 0.00 | 0.0000 | 58.447 | 0.000 |
| 17 | 160.71909 | 11.28965 | 1.496999 | 81.54 | 0.5375 | 60.756 | 106.191 |
| 18 | -77.08056 | 0.18000 | 1.000000 | 0.00 | 0.0000 | 61.089 | 0.000 |
| 19 | 72.77923 | 9.55436 | 1.592400 | 68.30 | 0.5456 | 58.661 | 98.693 |
| 20 | -287.80489 | (Variable) | 1.000000 | 0.00 | 0.0000 | 57.812 | 0.000 |
| 21 | 30.11803 | 0.75000 | 1.882997 | 40.76 | 0.5667 | 20.613 | -31.341 |
| 22 | 14.29638 | 3.03136 | 1.000000 | 0.00 | 0.0000 | 18.030 | 0.000 |
| 23 | 82.70942 | 0.75000 | 1.834000 | 37.16 | 0.5775 | 17.754 | -38.766 |
| 24 | 23.25465 | 4.32342 | 1.000000 | 0.00 | 0.0000 | 16.722 | 0.000 |
| 25 | -27.37561 | 5.07979 | 1.784723 | 25.68 | 0.6161 | 16.098 | 18.473 |
| 26 | -10.31612 | 0.80000 | 1.882997 | 40.76 | 0.5667 | 16.237 | -13.932 |
| 27 | -64.29573 | 0.13706 | 1.000000 | 0.00 | 0.0000 | 16.983 | 0.000 |
| 28 | 50.52808 | 2.49788 | 1.592701 | 35.31 | 0.5933 | 17.532 | 51.523 |
| 29 | -77.05607 | (Variable) | 1.000000 | 0.00 | 0.0000 | 17.805 | 0.000 |
| 30 | -26.56089 | 0.75000 | 1.740999 | 52.64 | 0.5467 | 18.167 | -23.864 |
| 31 | 54.27546 | 2.23907 | 1.808095 | 22.76 | 0.6307 | 19.565 | 50.804 |
| 32 | -172.65206 | (Variable) | 1.000000 | 0.00 | 0.0000 | 19.987 | 0.000 |
| 33 | 0.00000 | 1.40000 | 1.000000 | 0.00 | 0.0000 | 27.369 | 0.000 |
| 34 | 542.88958 | 3.08868 | 1.720000 | 43.69 | 0.5699 | 28.391 | 75.555 |
| 35 | -60.67748 | 0.15000 | 1.000000 | 0.00 | 0.0000 | 28.786 | 0.000 |
| 36 | 73.99391 | 3.90770 | 1.639999 | 60.07 | 0.5372 | 29.564 | 65.848 |
| 37 | -96.76937 | 0.22000 | 1.000000 | 0.00 | 0.0000 | 29.536 | 0.000 |
| 38 | 55.91255 | 6.24462 | 1.516330 | 64.14 | 0.5352 | 28.767 | 46.913 |
| 39 | -41.37922 | 1.00000 | 1.882997 | 40.76 | 0.5667 | 28.127 | -33.537 |
| 40 | 107.51631 | 34.00000 | 1.000000 | 0.00 | 0.0000 | 27.609 | 0.000 |
| 41 | 71.70949 | 5.19718 | 1.567322 | 42.80 | 0.5730 | 27.771 | 51.159 |
| 42 | -47.91739 | 0.30000 | 1.000000 | 0.00 | 0.0000 | 27.516 | 0.000 |
| 43 | -696.89119 | 1.00000 | 1.882997 | 40.76 | 0.5667 | 26.174 | -23.663 |
| 44 | 21.68388 | 6.16444 | 1.516330 | 64.14 | 0.5352 | 24.705 | 36.921 |
| 45 | -146.96232 | 0.20000 | 1.000000 | 0.00 | 0.0000 | 24.628 | 0.000 |
| 46 | 34.21408 | 7.74204 | 1.516330 | 64.14 | 0.5352 | 24.179 | 28.048 |
| 47 | -23.32121 | 1.00000 | 1.882997 | 40.76 | 0.5667 | 23.472 | -20.363 |
| 48 | 82.17483 | 0.87964 | 1.000000 | 0.00 | 0.0000 | 23.907 | 0.000 |
| 49 | 45.55541 | 6.21162 | 1.516330 | 64.14 | 0.5352 | 24.660 | 37.444 |
| 50 | -32.23243 | 4.00000 | 1.000000 | 0.00 | 0.0000 | 24.829 | 0.000 |
| 51 | 0.00000 | 33.00000 | 1.608590 | 46.44 | 0.5664 | 44.000 | 0.000 |
| 52 | 0.00000 | 13.20000 | 1.516800 | 64.17 | 0.5347 | 44.000 | 0.000 |
| 53 | 0.00000 | 0.00000 | 1.000000 | 0.00 | 0.0000 | 44.000 | 0.000 |

Aspherical surface data

Second surface $K = 1.22038 \times 10^{+2}$  $A_4 = 2.53837 \times 10^{-6}$  $A_6 = -2.87657 \times 10^{-10}$  $A_8 = -2.07660 \times 10^{-13}$  $A_{10} = -1.06570 \times 10^{-16}$
$A_{12} = 1.95302 \times 10^{-20}$
$A_3 = -3.54481 \times 10^{-6}$  $A_5 = -3.22306 \times 10^{-8}$  $A_7 = 8.19704 \times 10^{-12}$  $A_9 = 1.05404 \times 10^{-14}$  $A_{11} = -2.16883 \times 10^{-18}$ Eleventh surface $K = 3.15543$  $A_4 = 4.70704 \times 10^{-7}$  $A_6 = -3.45419 \times 10^{-10}$  $A_8 = -1.36646 \times 10^{-13}$  $A_{10} = 8.18824 \times 10^{-16}$
$A_{12} = -1.38102 \times 10^{-19}$
$A_3 = 1.61406 \times 10^{-6}$  $A_5 = 1.49821 \times 10^{-8}$  $A_7 = -5.08156 \times 10^{-12}$  $A_9 = -1.62543 \times 10^{-14}$  $A_{11} = -3.16884 \times 10^{-18}$ Fourteenth surface $K = -1.31207 \times 10$  $A_4 = 5.60204 \times 10^{-7}$  $A_6 = 1.39013 \times 10^{-10}$  $A_8 = 4.25359 \times 10^{-13}$  $A_{10} = -3.11847 \times 10^{-16}$
$A_{12} = 3.05178 \times 10^{-19}$
$A_3 = -1.74721 \times 10^{-6}$  $A_5 = -7.67941 \times 10^{-9}$  $A_7 = 7.56092 \times 10^{-12}$  $A_9 = -5.62862 \times 10^{-15}$  $A_{11} = -5.85101 \times 10^{-18}$ Various data

| | | | | | |
|---|---|---|---|---|---|
| Zoom ratio | 14.00 | | | | |
| Focal length | 4.50 | 9.45 | 18.00 | 32.40 | 63.00 |
| F-number | 1.90 | 1.90 | 1.90 | 1.90 | 2.80 |
| Angle of field | 50.71 | 30.20 | 16.99 | 9.63 | 4.99 |
| Image height | 5.50 | 5.50 | 5.50 | 5.50 | 5.50 |
| Total lens length | 312.36 | 312.36 | 312.36 | 312.36 | 312.36 |
| BF | 7.90 | 7.90 | 7.90 | 7.90 | 7.90 |
| d21 | 0.46 | 20.65 | 32.39 | 39.66 | 44.52 |
| d30 | 41.33 | 18.38 | 6.39 | 2.74 | 7.92 |
| d33 | 11.70 | 14.46 | 14.71 | 11.09 | 1.05 |
| d54 | 7.90 | 7.90 | 7.90 | 7.90 | 7.90 |
| Entrance pupil position | 32.17 | 41.64 | 54.98 | 73.95 | 104.41 |
| Exit pupil position | 453.20 | 453.20 | 453.20 | 453.20 | 453.20 |

-continued

|  | | | | | |
|---|---|---|---|---|---|
| Front principal point position | 36.71 | 51.29 | 73.71 | 108.71 | 176.32 |
| Rear principal point position | 3.40 | −1.55 | −10.10 | −24.50 | −55.10 |

Zoom lens unit data

| Unit | Leading surface | Focal length | Lens structure length | Front principal point position | Rear principal point position |
|---|---|---|---|---|---|
| 1 | 1 | 27.10 | 101.72 | 44.25 | 36.71 |
| 2 | 22 | −17.40 | 17.37 | 0.70 | −14.09 |
| 3 | 31 | −46.00 | 2.99 | −0.39 | −2.07 |
| 4 | 34 | 58.06 | 128.91 | 64.62 | −118.37 |

Embodiment 3

Figure 5:
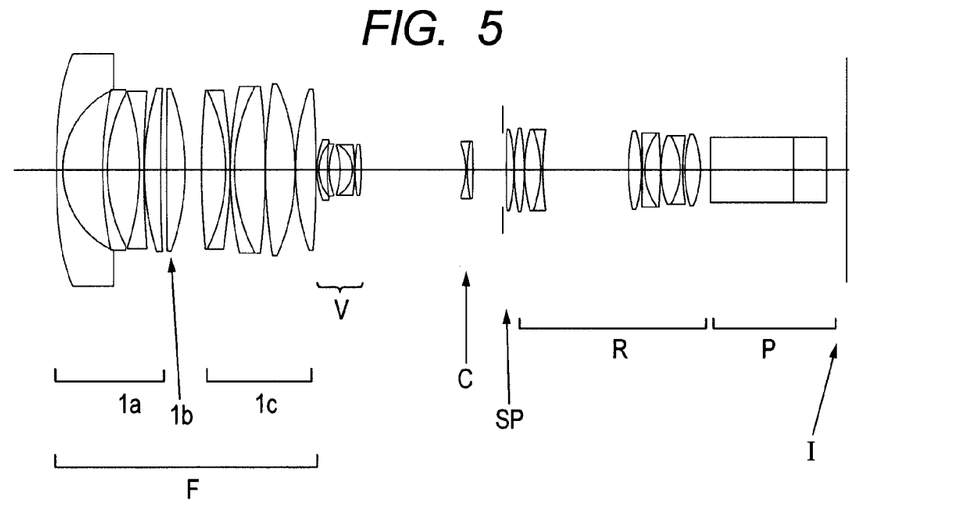
FIG. 5 is a cross sectional view at a wide-angle end according to Embodiment 3.
Figure 6A:
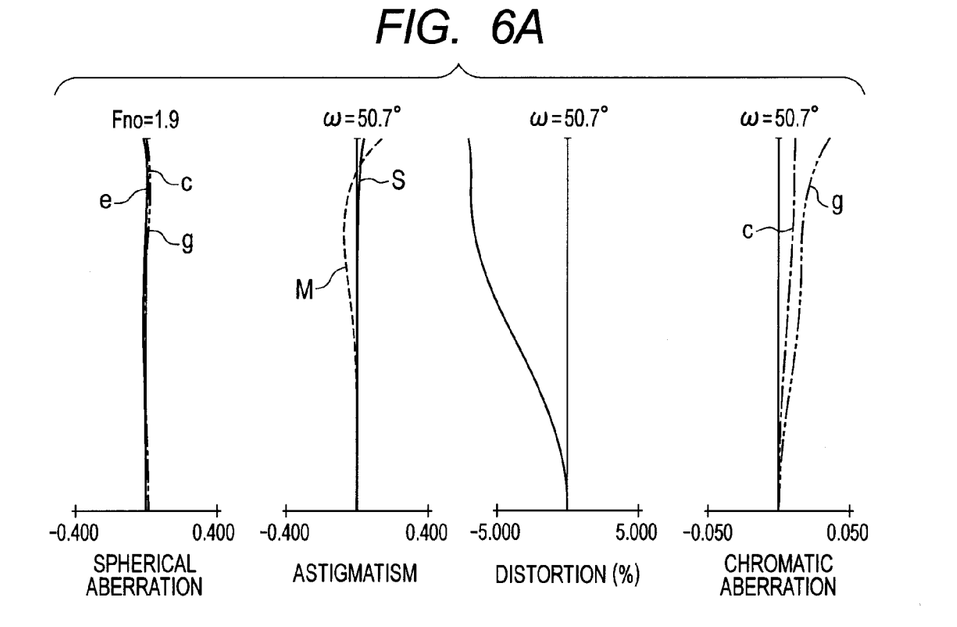
FIG. 6A is an aberration diagram at f=4.5 mm according to Embodiment 3.
Figure 6B:
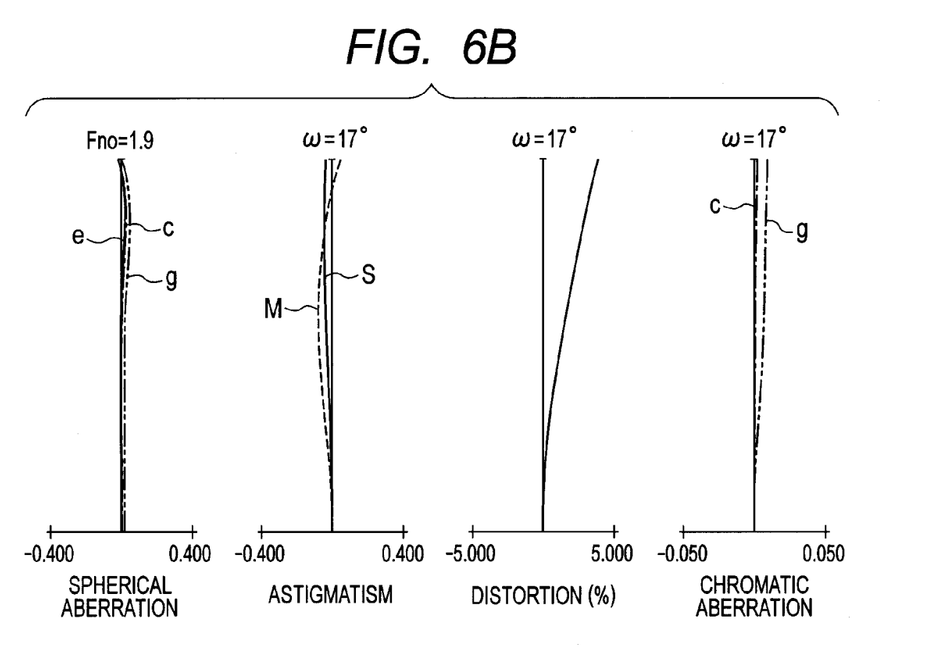
FIG. 6B is an aberration diagram at f=18 mm according to Embodiment 3.
Figure 6C:
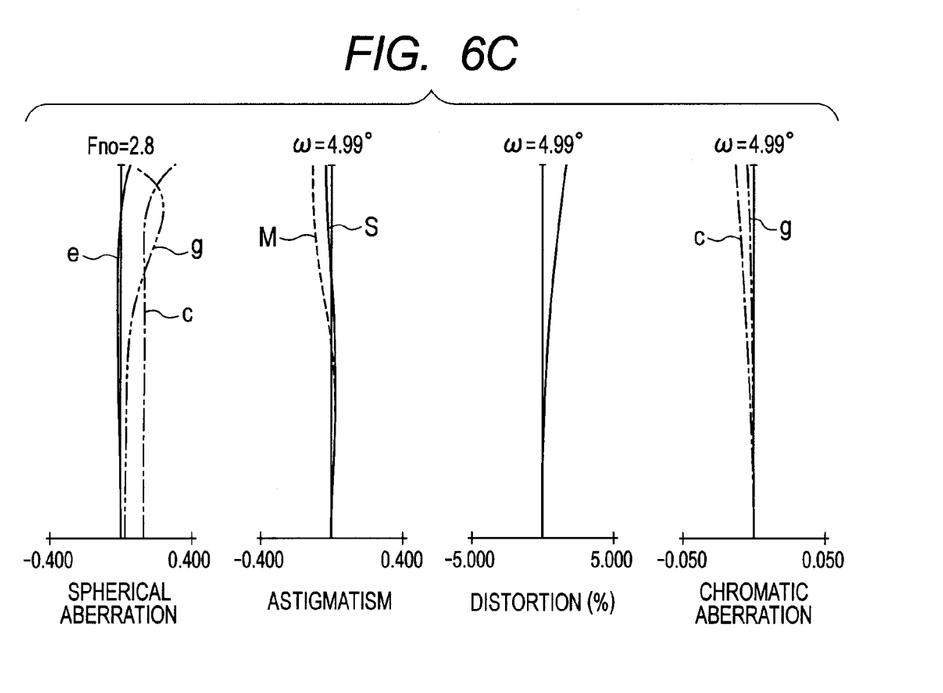
FIG. 6C is an aberration diagram at f=63 mm according to Embodiment 3.

FIG. 5 is a cross sectional view at the wide-angle end of a zoom lens of Embodiment 3 of the present invention. FIGS. 6A, 6B and 6C illustrate aberration diagrams when the zoom position of the zoom lens of Embodiment 3 is at the wide-angle end, at f=18 mm, and at the telephoto end.

The structure of the zoom lens of Embodiment 3 illustrated in FIG. 5 is the same as the structure of the zoom lens of Embodiment 1 illustrated in FIG. 1, and hence the description of the outline of the structure is omitted. Embodiment 3 has the same basic structure as Embodiment 1, but has a different optical surface shape, which is therefore described in detail in Numerical Embodiment 3 as following.

Values corresponding to the conditional expressions in Embodiment 3 are shown in Table 1. This numerical embodiment satisfies any of the conditional expressions, so as to achieve high optical performance in which the lateral chromatic aberration at the wide-angle end is satisfactorily corrected while realizing such a wide angle which a focal length at the wide-angle end is 4.8 mm or smaller.

Numerical Embodiment 3

| Surface No. | r | d | nd | vd | θgF | Effective diameter | Focal length |
|---|---|---|---|---|---|---|---|
| 1 | 497.51526 | 2.50000 | 1.772500 | 49.50 | 0.5519 | 83.220 | −44.576 |
| 2 | 32.27954 | 15.78408 | 1.000000 | 0.00 | 0.0000 | 58.417 | 0.000 |
| 3 | 138.71750 | 1.85000 | 1.696797 | 55.53 | 0.5433 | 58.249 | −145.373 |
| 4 | 58.36739 | 12.82599 | 1.000000 | 0.00 | 0.0000 | 55.533 | 0.000 |
| 5 | −87.56249 | 1.75000 | 1.696797 | 55.53 | 0.5433 | 55.445 | −101.312 |
| 6 | 375.57394 | 0.15000 | 1.000000 | 0.00 | 0.0000 | 57.149 | 0.000 |
| 7 | 96.65776 | 6.47622 | 1.896760 | 23.00 | 0.6108 | 59.058 | 125.062 |
| 8 | 637.13293 | 2.35982 | 1.000000 | 0.00 | 0.0000 | 58.926 | 0.000 |
| 9 | 1379.19179 | 7.39183 | 1.603112 | 60.64 | 0.5414 | 58.894 | 125.351 |
| 10 | −80.15564 | 6.56755 | 1.000000 | 0.00 | 0.0000 | 58.848 | 0.000 |
| 11 | 311.90237 | 9.54009 | 1.438750 | 94.99 | 0.5342 | 56.464 | 119.369 |
| 12 | −62.54231 | 1.65000 | 1.654115 | 39.70 | 0.5737 | 56.364 | −171.854 |
| 13 | −141.39938 | 0.15000 | 1.000000 | 0.00 | 0.0000 | 57.656 | 0.000 |
| 14 | 134.54394 | 1.65000 | 1.846660 | 23.78 | 0.6205 | 59.860 | −138.410 |
| 15 | 62.60715 | 12.19099 | 1.438750 | 94.99 | 0.5342 | 59.760 | 115.628 |
| 16 | −254.92568 | 0.18000 | 1.000000 | 0.00 | 0.0000 | 60.619 | 0.000 |
| 17 | 183.47269 | 11.76500 | 1.496999 | 81.54 | 0.5375 | 62.186 | 107.557 |
| 18 | −74.13037 | 0.18000 | 1.000000 | 0.00 | 0.0000 | 62.420 | 0.000 |
| 19 | 86.51621 | 8.04895 | 1.592400 | 68.30 | 0.5456 | 58.537 | 120.203 |
| 20 | −396.25611 | (Variable) | 1.000000 | 0.00 | 0.0000 | 57.656 | 0.000 |
| 21 | 28.30878 | 0.75000 | 1.882997 | 40.76 | 0.5667 | 21.214 | −31.561 |
| 22 | 13.90913 | 3.41105 | 1.000000 | 0.00 | 0.0000 | 18.456 | 0.000 |
| 23 | 98.04766 | 0.75000 | 1.834000 | 37.16 | 0.5775 | 18.166 | −39.462 |
| 24 | 24.67138 | 4.29632 | 1.000000 | 0.00 | 0.0000 | 17.153 | 0.000 |
| 25 | −28.37169 | 4.99624 | 1.784723 | 25.68 | 0.6161 | 16.572 | 18.377 |
| 26 | −10.36772 | 0.80000 | 1.882997 | 40.76 | 0.5667 | 16.705 | −13.841 |
| 27 | −68.61309 | 0.13706 | 1.000000 | 0.00 | 0.0000 | 17.558 | 0.000 |
| 28 | 49.02136 | 2.48015 | 1.592701 | 35.31 | 0.5933 | 17.759 | 51.708 |
| 29 | −81.67015 | (Variable) | 1.000000 | 0.00 | 0.0000 | 17.807 | 0.000 |
| 30 | −26.74395 | 0.75000 | 1.740999 | 52.64 | 0.5467 | 18.180 | −23.572 |
| 31 | 51.62707 | 2.26520 | 1.808095 | 22.76 | 0.6307 | 19.589 | 49.492 |
| 32 | −182.26268 | (Variable) | 1.000000 | 0.00 | 0.0000 | 20.004 | 0.000 |
| 33 | 0.00000 | 1.40000 | 1.000000 | 0.00 | 0.0000 | 27.359 | 0.000 |
| 34 | 542.88958 | 3.08868 | 1.720000 | 43.69 | 0.5699 | 28.380 | 75.555 |
| 35 | −60.67748 | 0.15000 | 1.000000 | 0.00 | 0.0000 | 28.776 | 0.000 |
| 36 | 73.99391 | 3.90770 | 1.639999 | 60.07 | 0.5372 | 29.553 | 65.848 |
| 37 | −96.76937 | 0.22000 | 1.000000 | 0.00 | 0.0000 | 29.525 | 0.000 |
| 38 | 55.91255 | 6.24462 | 1.516330 | 64.14 | 0.5352 | 28.757 | 46.913 |
| 39 | −41.37922 | 1.00000 | 1.882997 | 40.76 | 0.5667 | 28.116 | −33.537 |
| 40 | 107.51631 | 34.00000 | 1.000000 | 0.00 | 0.0000 | 27.598 | 0.000 |
| 41 | 71.70949 | 5.19718 | 1.567322 | 42.80 | 0.5730 | 27.759 | 51.159 |

-continued

| | | | | | | | |
|---|---|---|---|---|---|---|---|
| 42 | −47.91739 | 0.30000 | 1.000000 | 0.00 | 0.0000 | 27.504 | 0.000 |
| 43 | −696.89119 | 1.00000 | 1.882997 | 40.76 | 0.5667 | 26.163 | −23.663 |
| 44 | 21.68388 | 6.16444 | 1.516330 | 64.14 | 0.5352 | 24.696 | 36.921 |
| 45 | −146.96232 | 0.20000 | 1.000000 | 0.00 | 0.0000 | 24.619 | 0.000 |
| 46 | 34.21408 | 7.74204 | 1.516330 | 64.14 | 0.5352 | 24.183 | 28.048 |
| 47 | −23.32121 | 1.00000 | 1.882997 | 40.76 | 0.5667 | 23.763 | −20.363 |
| 48 | 82.17483 | 0.87964 | 1.000000 | 0.00 | 0.0000 | 24.212 | 0.000 |
| 49 | 45.55541 | 6.21162 | 1.516330 | 64.14 | 0.5352 | 24.985 | 37.443 |
| 50 | −32.23135 | 4.00000 | 1.000000 | 0.00 | 0.0000 | 25.145 | 0.000 |
| 51 | 0.00000 | 33.00000 | 1.608590 | 46.44 | 0.5664 | 23.010 | 0.000 |
| 52 | 0.00000 | 13.20000 | 1.516800 | 64.17 | 0.5347 | 16.393 | 0.000 |
| 53 | 0.00000 | 0.00000 | 1.000000 | 0.00 | 0.0000 | 13.582 | 0.000 |

Aspherical surface data

Second surface $K = 1.22038 \times 10^{+2}$  $A_4 = 2.53837 \times 10^{-6}$  $A_6 = -2.87657 \times 10^{-10}$  $A_8 = -2.07660 \times 10^{-13}$  $A_{10} = -1.06570 \times 10^{-16}$
$A_{12} = 1.95302 \times 10^{-20}$
$A_3 = -3.54481 \times 10^{-6}$  $A_5 = -3.22306 \times 10^{-8}$  $A_7 = 8.19704 \times 10^{-12}$  $A_9 = 1.05404 \times 10^{-14}$  $A_{11} = -2.16883 \times 10^{-18}$ Eleventh surface $K = 1.12003$  $A_4 = 6.82570 \times 10^{-7}$  $A_6 = -4.51683 \times 10^{-10}$  $A_8 = -4.46730 \times 10^{-13}$  $A_{10} = 1.04373 \times 10^{-15}$
$A_{12} = 2.19678 \times 10^{-19}$
$A_3 = 1.79526 \times 10^{-6}$  $A_5 = 2.20761 \times 10^{-8}$  $A_7 = -3.27504 \times 10^{-12}$  $A_9 = -1.39904 \times 10^{-14}$  $A_{11} = -3.98888 \times 10^{-18}$ Fourteenth surface $K = -4.34200$  $A_4 = 5.59008 \times 10^{-7}$  $A_6 = 2.64295 \times 10^{-19}$  $A_8 = 4.16296 \times 10^{-19}$  $A_{10} = -3.84235 \times 10^{-16}$
$A_{12} = 2.89656 \times 10^{-19}$
$A_3 = -1.30503 \times 10^{-6}$  $A_5 = -1.06332 \times 10^{-8}$  $A_7 = 6.69351 \times 10^{-12}$  $A_9 = -3.02532 \times 10^{-15}$  $A_{11} = -4.85728 \times 10^{-18}$ Various data

| | | | | | |
|---|---|---|---|---|---|
| Zoom ratio | 14.00 | | | | |
| Focal length | 4.50 | 9.45 | 18.00 | 32.40 | 63.00 |
| F-number | 1.90 | 1.90 | 1.90 | 1.90 | 2.80 |
| Angle of field | 50.71 | 30.20 | 16.99 | 9.63 | 4.99 |
| Image height | 5.50 | 5.50 | 5.50 | 5.50 | 5.50 |
| Total lens length | 314.00 | 314.00 | 314.00 | 314.00 | 314.00 |
| BF | 7.90 | 7.90 | 7.90 | 7.90 | 7.90 |
| d21 | 0.46 | 20.65 | 32.39 | 39.66 | 44.52 |
| d30 | 41.39 | 18.44 | 6.45 | 2.80 | 7.98 |
| d33 | 11.70 | 14.46 | 14.71 | 11.09 | 1.05 |
| d54 | 7.90 | 7.90 | 7.90 | 7.90 | 7.90 |
| Entrance pupil position | 31.83 | 41.31 | 54.64 | 73.62 | 104.07 |
| Exit pupil position | 453.08 | 453.08 | 453.08 | 453.08 | 453.08 |
| Front principal point position | 36.38 | 50.96 | 73.37 | 108.37 | 175.99 |
| Rear principal point position | 3.40 | −1.55 | −10.10 | −24.50 | −55.10 |

Zoom lens unit data

| Unit | Leading surface | Focal length | Lens structure length | Front principal point position | Rear principal point position |
|---|---|---|---|---|---|
| 1 | 1 | 27.10 | 103.01 | 43.91 | 36.97 |
| 2 | 22 | −17.40 | 17.62 | 0.95 | −14.01 |
| 3 | 31 | −46.00 | 3.02 | −0.37 | −2.07 |
| 4 | 34 | 58.06 | 128.91 | 64.63 | −118.37 |

TABLE 1

Values corresponding to conditional expressions in Embodiments 1 to 3

| Conditional Expression | | Numerical Embodiment 1 | Numerical Embodiment 2 | Numerical Embodiment 3 |
|---|---|---|---|---|
| (1) | (θpa − θna)/(vpa − vna) | −1.94 × 10⁻³ | −2.13 × 10⁻³ | −2.13 × 10⁻³ |
| (8) | \|f11/f13\| | 0.51 | 0.75 | 0.57 |
| (9) | Nn | 1.76 | 1.72 | 1.72 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-148581, filed Jun. 30, 2010, which is hereby incorporated by reference herein in its entirety.

What is claimed is:

1. A zoom lens, comprising, in order from an object side:
   a first lens unit which has positive refractive power and does not move for magnification-varying; and
   a second lens unit which has negative refractive power and moves for the magnification-varying, wherein the first lens unit comprises, in order from the object side: a first lens sub unit which has negative refractive power and does not move; a second lens sub unit which has positive refractive power and moves for focusing; and a third lens sub unit which has positive refractive power and does not move; and wherein the following expression is satisfied, $$-2.27 \times 10^{-3} < (\theta p - \theta na)/(\nu p - \nu na) < -1.9 \times 10^{-3},$$

where $\nu na$ and $\theta na$ represent an average value of an Abbe number $\nu$ and an average value of a partial dispersion ratio $\theta$ at a g-line and an F-line of negative lenses included in the first lens sub unit, respectively, $\nu p$ and $\theta p$ represent an Abbe number and a partial dispersion ratio of a positive lens having a smallest Abbe number among lenses constituting the first lens sub unit, respectively, $\theta = (Ng - NF)/(NF - NC)$, and Ng, NF and NC denote refractive indexes at the g-line, the F-line and a C-line, respectively.

2. A zoom lens according to claim 1, wherein the following expression is satisfied, $$0.5 < |f11/f13| < 0.77,$$

where f11 represents a focal length of the first lens sub unit, and f13 represents a focal length of the third lens sub unit.

3. A zoom lens according to claim 1, wherein the following expression is satisfied, $$1.71 < Nn < 1.78,$$

where Nn represents an average refractive index of negative lenses included in the first lens sub unit.

4. A zoom lens according to claim 1, further comprising, on an image plane side of the second lens unit, in order from the object side: a third lens unit which has negative refractive power and moves for correcting image plane variation due to the magnification-varying; and a fourth lens unit which has positive refractive power and does not move for the magnification-varying.

5. An image pickup apparatus comprising the zoom lens according to claim 1.

6. An image pickup apparatus according to claim 5, wherein the following expression is satisfied, $$0.33 < fw/IS < 0.44,$$

where fw represents a focal length at a wide-angle end and IS represents an image size.

* * * * *